United States Patent [19]

Bingham

[11] 4,397,142

[45] Aug. 9, 1983

[54] CODED THREADS AND SHEET MATERIAL USEFUL FOR MAKING SUCH CODED THREADS

[75] Inventor: Wallace K. Bingham, North Saint Paul, Minn.

[73] Assignee: Minnesota Mining and Manufacturing Company, Saint Paul, Minn.

[21] Appl. No.: 327,803

[22] Filed: Dec. 7, 1981

[51] Int. Cl.³ .............................................. D02G 3/06
[52] U.S. Cl. .................................... 57/238; 2/243 R;
40/2 R; 57/244; 57/250; 57/259; 428/323;
428/372; 428/916
[58] Field of Search ....................... 428/323, 916, 372;
40/615, 2 R; 57/238, 244, 250, 259; 2/243 R

[56] References Cited

U.S. PATENT DOCUMENTS

| | | | |
|---|---|---|---|
| 2,372,868 | 4/1945 | Warren | 57/238 |
| 2,567,233 | 9/1951 | Palmquist et al. | 428/246 X |
| 2,937,668 | 5/1960 | Carey, Jr. et al. | 139/426 X |
| 3,050,824 | 8/1962 | Lemelson | 428/372 |
| 3,154,872 | 11/1964 | Nordgren | 40/615 |
| 3,172,942 | 3/1965 | Berg | 428/246 X |
| 3,251,704 | 5/1966 | Nellessen | 106/193 P |
| 3,382,555 | 5/1968 | Smoots, Jr. | 219/388 |
| 3,382,655 | 5/1968 | Wasserman | 57/16 |
| 3,399,070 | 8/1968 | Scharf | 427/205 |
| 3,560,447 | 2/1971 | Bingham | 428/402 |
| 3,772,200 | 11/1973 | Livesay | 252/645 |
| 3,802,944 | 4/1974 | Tung | 428/247 X |
| 3,832,038 | 8/1974 | Johnson | 350/236 |
| 4,053,433 | 10/1977 | Lee | 428/373 X |

Primary Examiner—Henry F. Epstein
Attorney, Agent, or Firm—C. Alexander; D. M. Sell; R. R. Tamte

[57] ABSTRACT

Coded threads and sheet material for making such threads useful in counterfeit-inhibiting garments. The sheet material comprises transparent microspheres, a specularly reflective layer underlying the microspheres, and a polymeric layer underlying the specularly reflective layer and containing particulate matter which may be varied from sheet material to sheet material to encode information and allow identification of the sheet material. The sheet material is split in narrow widths and incorporated into threads.

15 Claims, 2 Drawing Figures

CODED THREADS AND SHEET MATERIAL USEFUL FOR MAKING SUCH CODED THREADS

A major problem for manufacturers of popular trademarked items is the sale of counterfeit goods carrying a counterfeit label purporting to identify the goods as made by the trademark owner. The manufacturers of counterfeited items are desirous of products and procedures by which they could provide counterfeit-resistant labels, so that retailers, consumers, investigators, and other persons could readily detect whether the label on a garment was a valid one.

The present invention provides a new thread or yarn which may be used to manufacture distinctive and counterfeit-inhibiting garments or garment labels, and also provides a new sheet material useful to make such a thread. Briefly, the new sheet material comprises a monolayer of transparent microspheres optically exposed at the front of the sheet material, a specularly reflective layer underlying the microspheres at the approximate point where the microspheres focus light that is incident on the front of the sheet material, and one or more polymeric layers in which the monolayer of microspheres is supported. At least one polymeric layer in the sheet material contains a particulate material which may be varied in composition from sheet material to sheet material in order to give the sheet material a particular identification. The particular composition of particulate material becomes a code which may be read by an observer to identify the sheet material.

This sheet material may be slit into narrow widths and used as a yarn to prepare a distinctive thread. A useful procedure for forming a thread is described in U.S. Pat. No. 3,382,655, which teaches intertwining a narrow-width sheet material and other yarns to form a composite thread or yarn. According to the present invention, the composite thread is coded by the code-imparting particulate material in the sheet material. Coded garments or garment labels are prepared using the thread, typically as a minor component, in weaving, knitting or otherwise preparing the garment or label.

Labels prepared with thread of the invention offer an improved degree of counterfeit-resistance, because the availability of particular coded threads can be controlled and limited to the trademark owner. Counterfeit-resistance is further improved by use in the sheet material of particulate material of limited availability, for example, particles of distinctive shapes and colors.

An important advantage of coded threads of the invention is that the threads are readily located in a label. When the label is viewed under retroreflective viewing conditions (for example, a flashlight is beamed at the label from a position near the eyes of the observer, or the label is viewed through a retroviewer such as taught in U.S. Pat. No. 3,832,038), the coded thread sparkles with retroreflective light. The presence of a retroreflective thread is a first indication that the label is a valid one. Also, the retroreflective light draws the observer to the thread, where he can look for the code-imparting particles in the polymeric layer, and further confirm the validity of the label.

In a preferred sheet material of the invention, the polymeric layer containing the code-imparting particulate material is an adhesive layer by which the retroreflective material is adhered to a polymeric support film. The polymeric film is preferably transparent, and carries a specularly reflective layer, thereby making one side of the sheet material specularly reflective, and imparting such specular reflection to the coded threads. The specular reflection offers another means for attraction to a coded thread of the invention in a product label.

PRIOR ART

U.S. Pat. No. 2,937,668 teaches a retroreflective textile yarn for use in garments that give a wearer increased visibility at nighttime. The threads comprise core yarns coated with binder material and covered over their outside surface with a concentric layer of glass microspheres partially embedded in the binder material and having specularly reflective metal coated on their embedded surface. The threads are brightly retroreflective, but they include no particulate or other encoding material, and the patent makes no suggestion that the threads be used for counterfeit-resistant labels.

U.S. Pat. No. 3,050,824 is also directed to reflective threads for use in garments. The threads are made from transparent resins in which transparent spheres are embedded. The threads are not demonstrated to be effectively retroreflective (no consideration is given to the needed relationship between the indices of refraction of the spheres and the resin in which the spheres are embedded), and no suggestion is made for encoding the threads or using them in a counterfeit-resistant label.

U.S. Pat. No. 2,372,868 teaches a rope made from multiple strands in the rope containing faceted surfaces for reflection and another set of strands containing luminous material. The rope is intended for use along highways to mark curves, either by reflection of light from the headlights of vehicles or, when the rope is outside the range of the vehicle headlights, by emission of light from the luminous strands. There is no teaching of encoding the rope, or of use of coded particulate material; nor are the reflective strands "retroreflective;" nor is there any suggestion of utility for an encoded retroreflective thread or yarn.

U.S. Pat. No. 3,399,070 teaches a flecked multicolored yarn useful for providing decorative effects in fabrics. The yarn is made by coating each side of a base web with a heat-reactive thermoplastic layer, adhering flecks of colored or metallic material on the layers, and slitting the web to yarn size. The yarn has no retroreflective properties, nor are the flecks of colored or metallic material used for code purposes.

None of the above references is concerned with the problem of counterfeited products and labels, nor do any of them offer a solution to the problem such as is offered by the present invention. The present invention provides threads having a unique combination of properties, including both retroreflectivity and coded information, and these threads make possible garments and labels of unique utility. The new labels can be readily examined for validity, and have an improved degree of counterfeit-resistance, and none of the references would lead to such a product.

DETAILED DESCRIPTION

Figure 1:
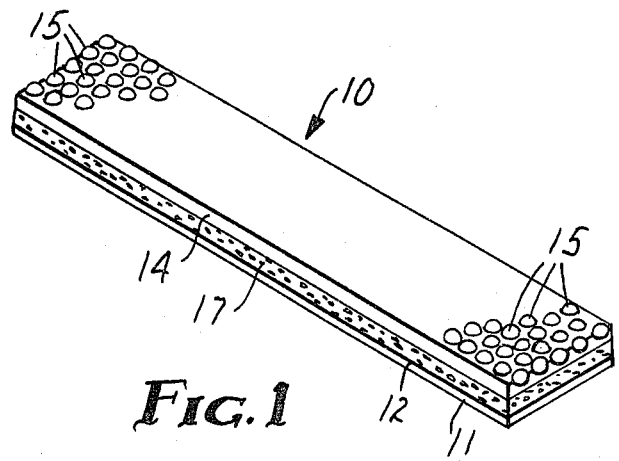
FIG. 1 is a perspective view of an illustrative sheet material of the invention.
Figure 2:
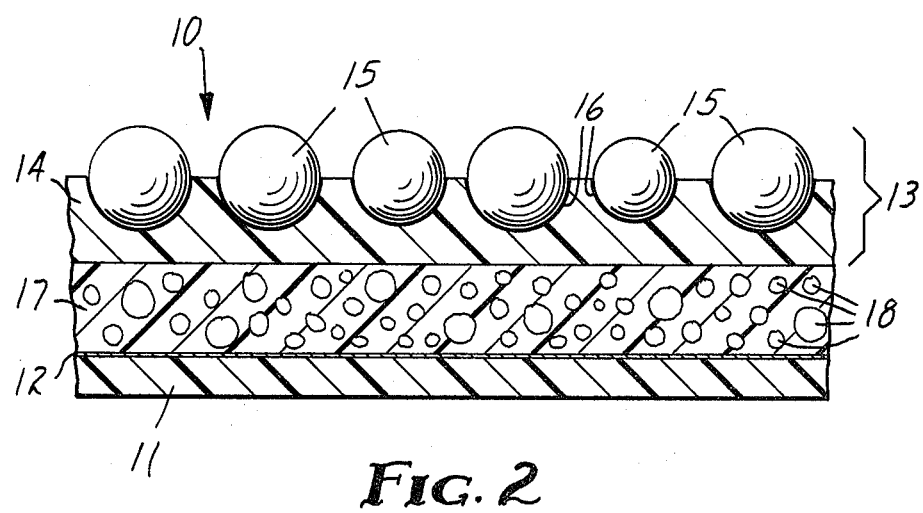
FIG. 2 is an enlarged sectional view through the illustrative sheet material shown in FIG. 1.

The illustrative sheet material 10 shown in FIGS. 1 and 2 comprises a polymeric film 11, which preferably carries a specularly reflecting layer 12 such as vapor-coated aluminum. A retroreflective sheet or layer 13 is disposed over the specularly reflective layer 12 and comprises a sublayer 14 of polymeric binder material, a monolayer of transparent microspheres 15 partially embedded in the sublayer of binder material and partially exposed above that sublayer, and a layer 16 of specularly reflective material underlying the microspheres. A layer of adhesive 17 adheres the retroreflective layer to the specularly reflective layer 12 on the polymeric film 11.

In the illustrated embodiment, the code-imparting particulate material 18 is dispersed in the adhesive layer 17. Other embodiments do not include a polymeric film 11 or specularly reflective layer 12, and the particulate material 18 is dispersed in a non-adhesive layer coated over the layer 14 of polymeric binder material in place of the adhesive layer 17. In still other embodiments, the particulate material 18 is dispersed directly in the binder layer 14, which is usually then a thicker layer than it is in the illustrated embodiment.

The particles 18 should be small, typically averaging less than about 50 micrometers in diameter and preferably less than about 25 micrometers in diameter, so that they can be dispersed in a thin polymeric layer. To make the particles more easily seen, they should average about 2 or more, and preferably about 5 or more, micrometers in diameter.

The particulate material 18 preferably has visible characteristics that allow formation of codes that can be visibly read by an observer. Spherical pigment particles as described in U.S. Pat. Nos. 3,251,704 or 3,560,447 are preferred. Such particles may be made in desired sizes and in a wide variety of colors. A vast number of different color combinations may be provided for coding purposes. Also, the numerical proportion or density of all the particles or particular particles per unit volume can be varied to provide additional variation in the code.

Another useful visible particle is taught in U.S. Pat. No. 4,053,433 and comprises a particular orderly sequence of visually color distinguishable dyed and/or pigmented layers of organic materials. The particles are coded by the particular sequence of colored layers.

In some embodiments the particulate material is sensed by machine, as by sensing magnetic particles with a gauss meter. Also microparticles taught in U.S. Pat. No. 3,772,200 contain predetermined quantities of certain chemical elements which may be analyzed by a microprobe analyzer. Fluorescent dyes may also be used and identified by use of an appropriate light source, such as a source of ultraviolet light.

Mixtures of different kinds of particles are used to further vary a code or to provide alternative detection mechanisms. Also, other components of a sheet material or thread may be varied to further vary a code. For example, a thread of slit retroreflective sheet material may be combined with different combinations of colored yarns to vary a code.

The polymeric film included in preferred sheet materials of the invention is usually transparent to expose a specularly reflective layer coated on and protected by the polymeric film. However, since the specularly reflective layer is not essential to operation of the invention, the film can be opaque and the specularly reflective layer could be omitted. The polymeric film may be colored various colors which will give it initial conspicuity prior to viewing under retroreflective viewing conditions. Also the polymeric film may be transparent and the specularly reflective layer omitted, whereupon particles dispersed in the adhesive layer or coated and adhered into the polymeric film may be viewed through the film.

In still another embodiment of the invention the retroreflective layer is not an exposed-lens retroreflector as shown in FIGS. 1 and 2, but instead is an enclosed-lens construction. In the enclosed-lens construction, a layer of transparent polymeric material overlies the microspheres, and usually the microspheres are spaced from the specularly reflective layer by a spacing layer of transparent polymeric material. Code-imparting particulate material may be dispersed in a layer underlying the specularly reflective layer.

The microspheres in an enclosed-lens construction generally have an index of refraction of about 2.2, and focus light onto the spaced specularly reflective layer. The microspheres in an exposed-lens construction generally have an index of refraction of about 1.85 to 2, and preferably about 1.9. Enclosed-lens sheet materials have the advantage that they retroreflect even when wet.

The invention will be further illustrated by the following example. Glass microspheres ranging from 40 to 60 micrometers and having an index of refraction of 1.9 were partially embedded into a polyethylene-coated paper to a depth of approximately one-third the diameter of the exposed surfaces of the microspheres by passing the web through a vacuum vapor coater. A layer of binder material comprising 17.4 parts of acrylonitrile-butadiene elastomer (Hycar 1001×255 of B. F. Goodrich Chemical Company), 23.2 parts of a solution comprising phenol-formaldehyde one-step-type liquid thermosetting resin dissolved at 50 percent solids in methyl isobutyl ketone (Durez 1429 of Hooker Chemical Company) and 3.5 parts dioctlylphthalate plasticizer, the whole mixture being dissolved in methyl isobutyl ketone at a solids concentration of 32.5 percent, was knife-coated over the aluminum coating to provide a 0.008-inch thick wet coating, and the layer then dried in an oven.

Next an adhesive material was prepared comprising a high molecular weight thermoplastic polyurethane made from an aromatic diisocyanate and a polyester (Estane 5713 of B. F. Goodrich Chemical Company) dissolved in a mixture of methyl ethyl ketone and dimethyl formamide at a 22 percent solids concentration and containing one-half percent by weight (of the nonvolatile ingredients) of yellow spherical pigment particles ranging from 2 to 40 micrometers in diameter and one-half percent by weight green spherical pigment particles between 5 and 45 micrometers in diameter. The adhesive composition was knife-coated onto the binder layer to provide a 0.008-inch-thick wet layer, and the layer oven dried. The resulting sheet material was laminated to a 0.0005-inch-thick film of polyethylene terephthalate which had been vapor-coated with aluminum, by pressing the adhesive layer against the aluminum layer and heating the assembly to 300° F. (148° C.).

The polyethylene-coated paper was then removed, and the material slit in narrow widths about 0.0145 inch wide. The narrow widths were incorporated into a thread by interwining them with a nylon yarn, and the resulting thread used as one thread in a garment. The thread was readily detected in the label both in ordinary daylight because of the specular reflection of the aluminum on the polyethylene terephthalate film, and under

What is claimed is:

1. A set of sheet materials for preparing distinctly coded threads useful in counterfeit-inhibiting garments, each sheet material comprising a monolayer of transparent microspheres optically exposed at the front of said sheet material, a specularly reflective layer underlying the microspheres at the approximate point where the microspheres focus light that is incident on the front of said sheet material, and a polymeric layer underlying the specularly reflective layer and containing particulate matter dispersed therein, the composition of the particulate material in each distinct sheet material of the set differing in a predetermined manner from the composition of the particulate material in all other sheet materials of the set, and the different compositions providing coded information which may be read by an observer to identify the sheet material and a thread made from the sheet material.

2. Sheet material of claim 1 in which the particles average between about 2 and 50 micrometers in diameter.

3. Sheet material of claim 1 in which the particulate material comprises a plurality of differently colored particles, and the particulate materials in the different sheet materials differ as to the color of particles or proportion of particular colored particles in the particulate material.

4. Sheet material of claim 3 in which the colored particles comprise spherical pigment particles having an average diameter between about 2 and 50 micrometers.

5. Sheet material of claim 1 which includes a transparent polymeric film which carries a specularly reflective layer underlying the polymeric layer.

6. Sheet material for preparing coded threads useful in counterfeit-inhibiting garments comprising (1) a transparent polymeric film which carries a specularly reflective layer; (2) a retroreflective layer which comprises (a) a sublayer of binder material, (b) a monolayer of transparent microspheres partially embedded in the sublayer of binder material and partially exposed above said sublayer, and (c) a sublayer of specularly reflective material underlying the microspheres; and (3) an adhesive layer by which the retroreflective layer is adhered to the polymeric film, the adhesive layer including a plurality of colored particles of at least two different colors dispersed in the layer, whereby an observer may identify the sheet material and threads made from the sheet material.

7. Sheet material of claim 6 in which the colored particles comprise spherical pigment particles.

8. A thread comprising sheet material of claim 1 or 6 slit to a narrow width and intertwined with other yarns.

9. A label comprising a thread which comprises sheet material of claim 1 or 6 slit to a narrow width and intertwined with other yarns.

10. A garment comprising a thread which comprises sheet material of claim 1 or 6 slit to a narrow width and intertwined with other yarns.

11. A set of different coded threads useful in counterfeit-inhibiting garments comprising a long narrow width of sheet material which comprises a monolayer of transparent microspheres optically exposed at the front of said sheet material, a specularly reflective layer underlying the microspheres at the approximate point where the microspheres focus light that is incident on the front of the sheet material, and a polymeric layer underlying said specularly reflective layer and containing particulate material dispersed therein; the composition of the particulate material in each distinct coded thread of the set differing in a predetermined manner from the composition of the particulate material in all other coded threads of the set, and the different compositions providing coded information which may be read by an observer to identify the thread.

12. Coded threads of claim 11 in which the particulate material comprises a mixture of at least two different varieties of differently colored particles.

13. Coded threads of claim 12 in which the colored particles comprise spherical pigment particles having an average diameter between about 2 to 50 micrometers.

14. Garment labels comprising threads of claims 11, 12 or 13.

15. Garments comprising threads of claims 11, 12 or 13.

* * * * *